United States Patent
Garty et al.

(10) Patent No.: US 11,108,647 B2
(45) Date of Patent: Aug. 31, 2021

(54) SERVICE MAPPING BASED ON DISCOVERED KEYWORDS

(71) Applicant: ServiceNow, Inc., Santa Clara, CA (US)

(72) Inventors: Asaf Garty, Sdei Hemed (IL); Tom Bar Oz, Herzliya (IL); Robert Bitterfeld, Petach Tikva (IL); Bary Solomon, Petach Tikva (IL); Daniel Badyan, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 28 days.

(21) Appl. No.: 16/247,272

(22) Filed: Jan. 14, 2019

(65) Prior Publication Data

US 2020/0228414 A1 Jul. 16, 2020

(51) Int. Cl.
*H04L 12/24* (2006.01)
*H04L 29/08* (2006.01)
*G06F 16/14* (2019.01)

(52) U.S. Cl.
CPC ............ *H04L 41/20* (2013.01); *G06F 16/148* (2019.01); *H04L 41/22* (2013.01); *H04L 67/28* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,601,234 B1 | 7/2003 | Bowman-Amuah |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,027,411 B1 | 4/2006 | Pulsipher |
| 7,028,301 B2 | 4/2006 | Ding |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |

(Continued)

*Primary Examiner* — Younes Naji
(74) *Attorney, Agent, or Firm* — Fletcher Yoder, PC

(57) ABSTRACT

A computing system is disposed within a computational instance of a remote network management platform associated with a managed network. The computing system (i) performs a discovery process that identifies attributes of computing devices and software applications disposed within the managed network; (ii) generates a list of keywords based on the identified attributes as stored, including a particular keyword associated with a first computing device or a first software application of those disposed within the managed network; (iii) searches for the particular keyword in one or more files from the managed network; (iv) determines that the particular keyword is included in a file associated with a second computing device or a second software application of those disposed within the managed network; and (v) defines an operational mapping between: (a) the first computing device or the first software application and (b) the second computing device or the second software application.

20 Claims, 9 Drawing Sheets

(56) References Cited

U.S. PATENT DOCUMENTS

| | | | |
|---|---|---|---|
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,224,683 B2 | 7/2012 | Manos | |
| 8,266,096 B2 | 9/2012 | Navarrete | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,887,133 B2 | 11/2014 | Behnia | |
| 9,015,188 B2 | 4/2015 | Behne | |
| 9,037,536 B2 | 5/2015 | Vos | |
| 9,137,115 B2 | 9/2015 | Mayfield | |
| 9,239,857 B2 | 1/2016 | Trinon | |
| 9,323,801 B2 | 4/2016 | Morozov | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,659,051 B2 | 5/2017 | Hutchins | |
| 9,792,387 B2 | 10/2017 | George | |
| 9,852,165 B2 | 12/2017 | Morozov | |
| 10,002,203 B2 | 6/2018 | George | |
| 10,291,478 B1* | 5/2019 | Hosamani | H04L 41/0873 |
| 2016/0188730 A1* | 6/2016 | Delli Santi | G06F 16/951 707/728 |
| 2017/0068721 A1* | 3/2017 | Chafle | G06F 11/079 |
| 2018/0150487 A1* | 5/2018 | Olivier | G06F 8/36 |
| 2018/0285982 A1* | 10/2018 | Pai | G06Q 10/067 |
| 2019/0215688 A1* | 7/2019 | Zavesky | H04L 67/125 |

* cited by examiner

SERVICE MAPPING BASED ON DISCOVERED KEYWORDS

BACKGROUND

A remote network management platform may take the form of a hosted environment that provides an application Platform-as-a-Service (aPaaS) to users, particularly to operators of a managed network such as an enterprise. The services provided may take the form of web-based portals and/or software applications that enterprises, and both internal and external users thereof, may access through computational instances of the remote network management platform.

In order for the remote network management platform to administer such services to the managed network, the remote network management platform may perform a discovery process that involves determining what computing devices and software applications are present in the managed network, as well as the operational relationships between the devices and applications.

SUMMARY

The embodiments herein use a keyword-based service mapping technique to determine what computing devices and software applications are present in a managed network, as well as the operational relationships between the devices and applications. Traditionally, a remote network management platform could perform service mapping for a managed network by searching files disposed within the managed network according to a predefined set of rules that specify particular files to look for and particular text patterns to look for within those files. Such a narrowly-tailored rule-based discovery process may be cumbersome, as the rules may need to be adapted for managed networks that use different technology variants.

The systems and methods disclosed herein help address these or other issues by allowing the remote network management platform to search for keywords in files disposed within the managed network without limiting the search to narrowly-tailored rules. To achieve this, the remote network management platform may perform an initial discovery process to identify attributes of computing devices and software applications of the managed network, and the remote network management platform may use those identified attributes to generate a list of keywords, each keyword being associated with a particular identified computing device or software application. The remote network management platform may then search various files associated with the computing devices and software applications of the managed network. Responsive to finding a particular keyword in a searched file, the remote network management platform may define an operational mapping between the device or application associated with the particular keyword and the device or application associated with the searched file.

Accordingly, a first example embodiment may involve a computing system disposed within a computational instance of a remote network management platform that is associated with a managed network, the computing system containing a configuration management database (CMDB) and being configured to: (i) perform a discovery process that identifies attributes of computing devices and software applications disposed within the managed network; (ii) store, in the CMDB, the identified attributes; (iii) generate a list of keywords based on the identified attributes as stored, wherein a particular keyword in the list of keywords is associated with a first computing device or a first software application of those disposed within the managed network; (iv) search for the particular keyword in one or more files from the managed network that are associated with additional computing devices or additional software applications of those disposed within the managed network; (v) determine that the particular keyword is included in a file associated with a second computing device or a second software application of those disposed within the managed network; (vi) define an operational mapping between: (a) the first computing device or the first software application and (b) the second computing device or the second software application; and (vii) store, in the CMDB, a representation of the operational mapping.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
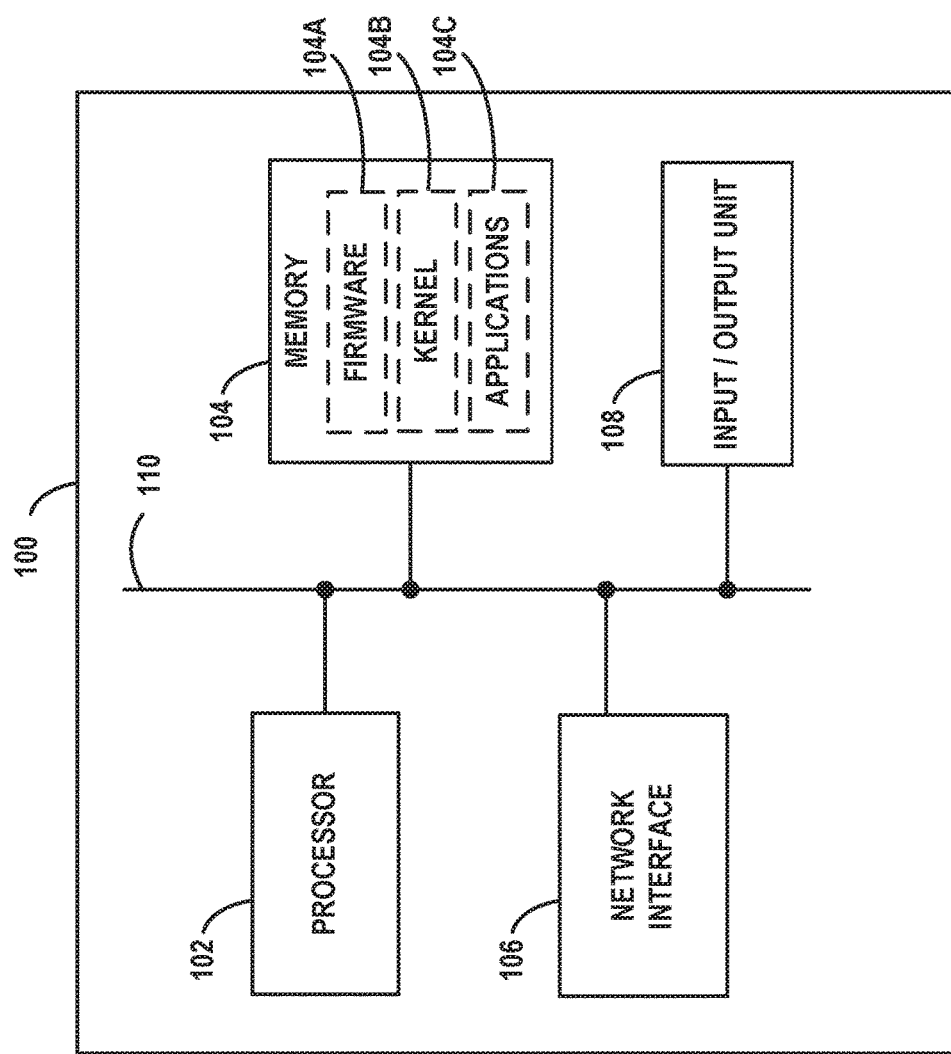
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
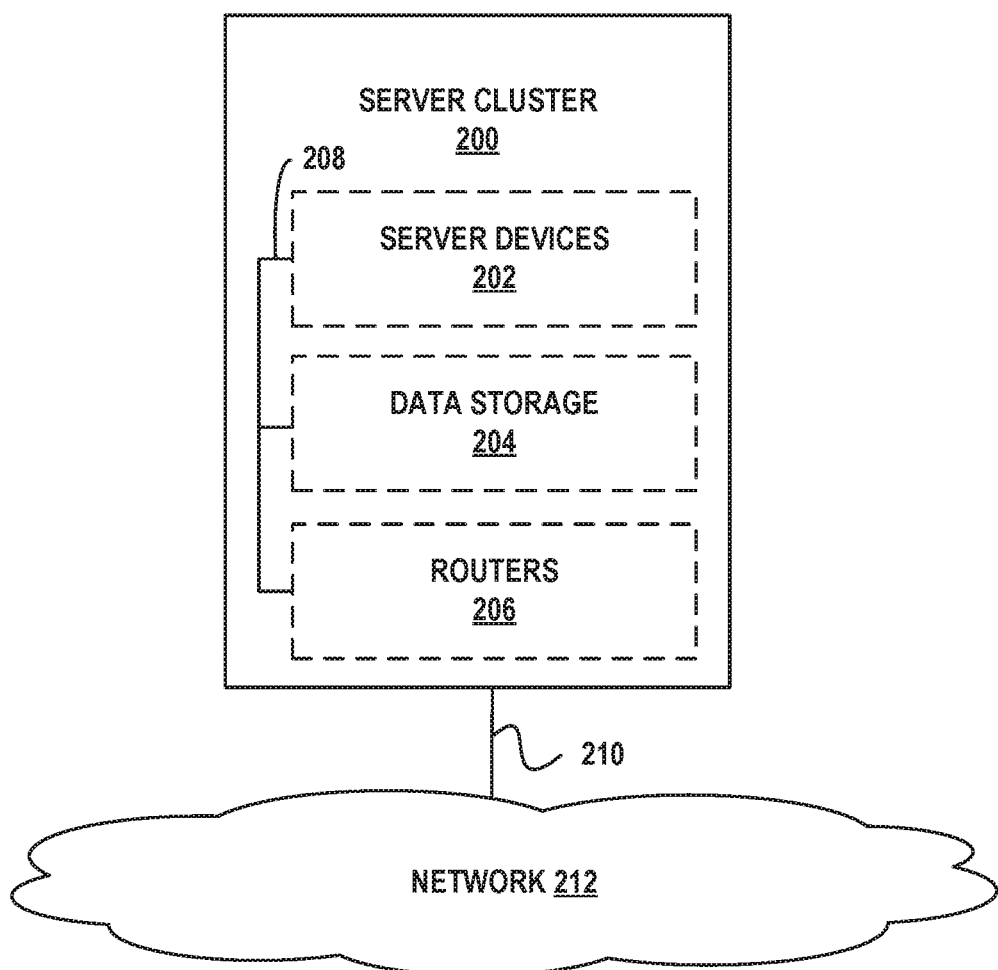
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
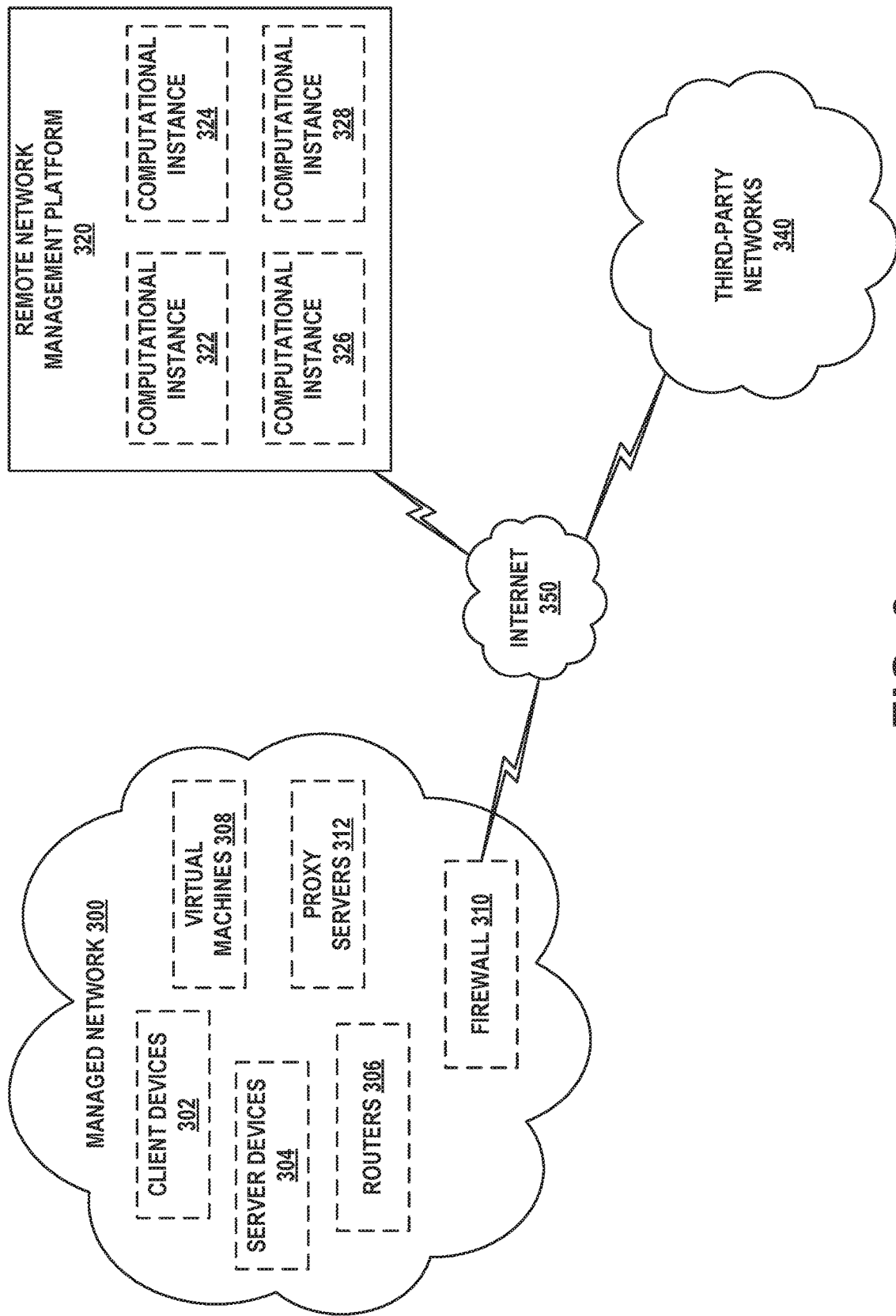
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
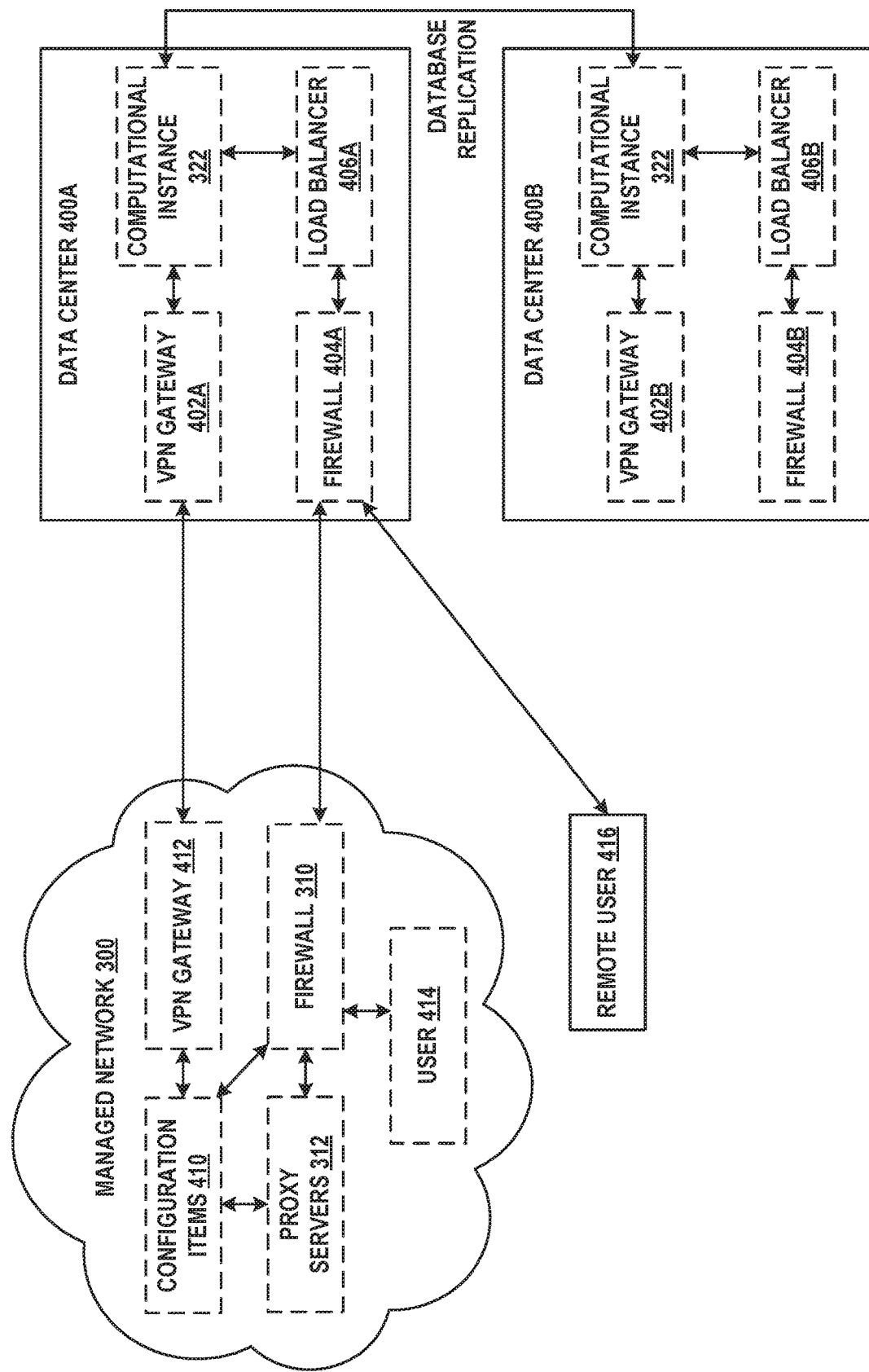
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
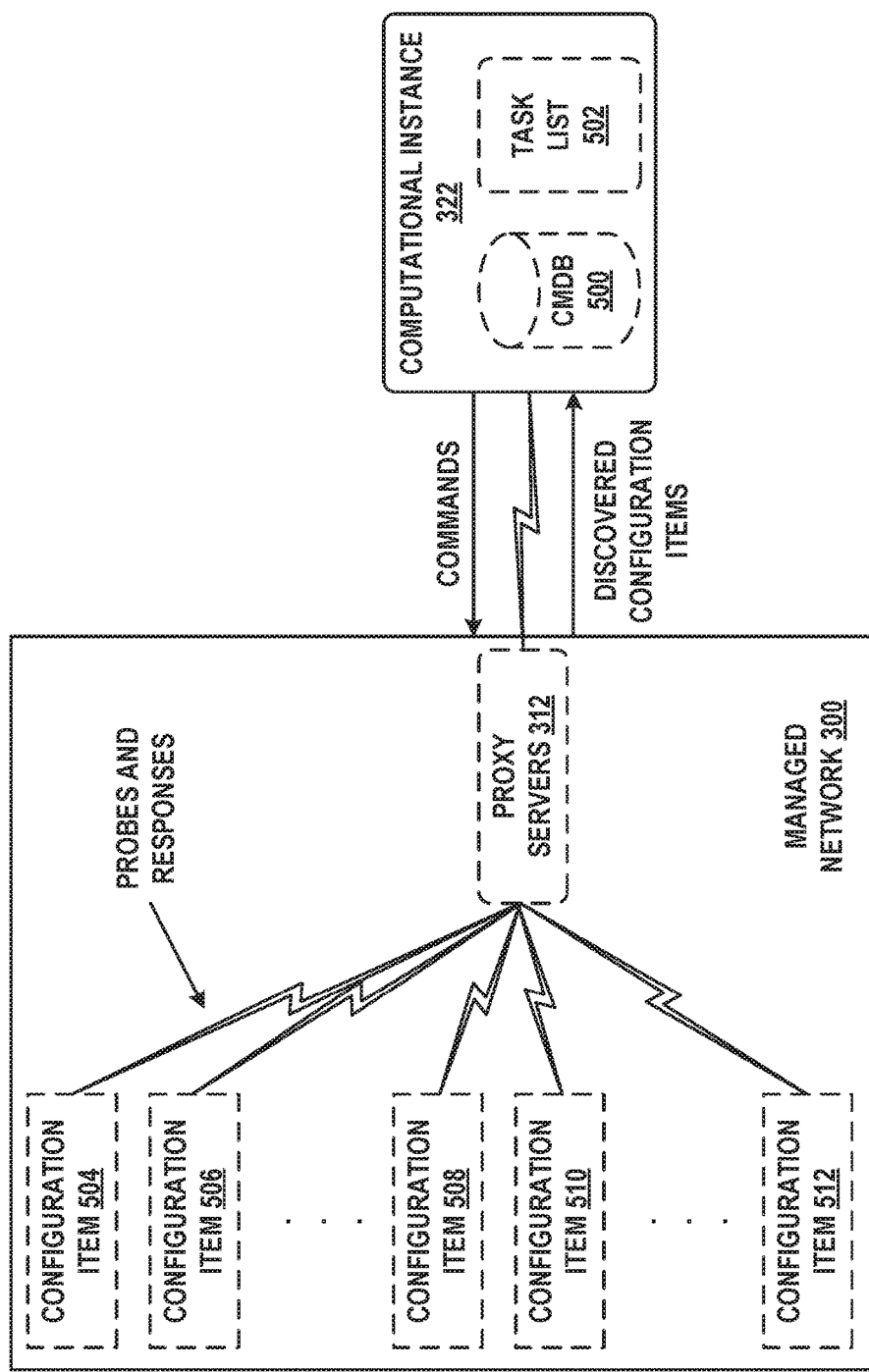
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
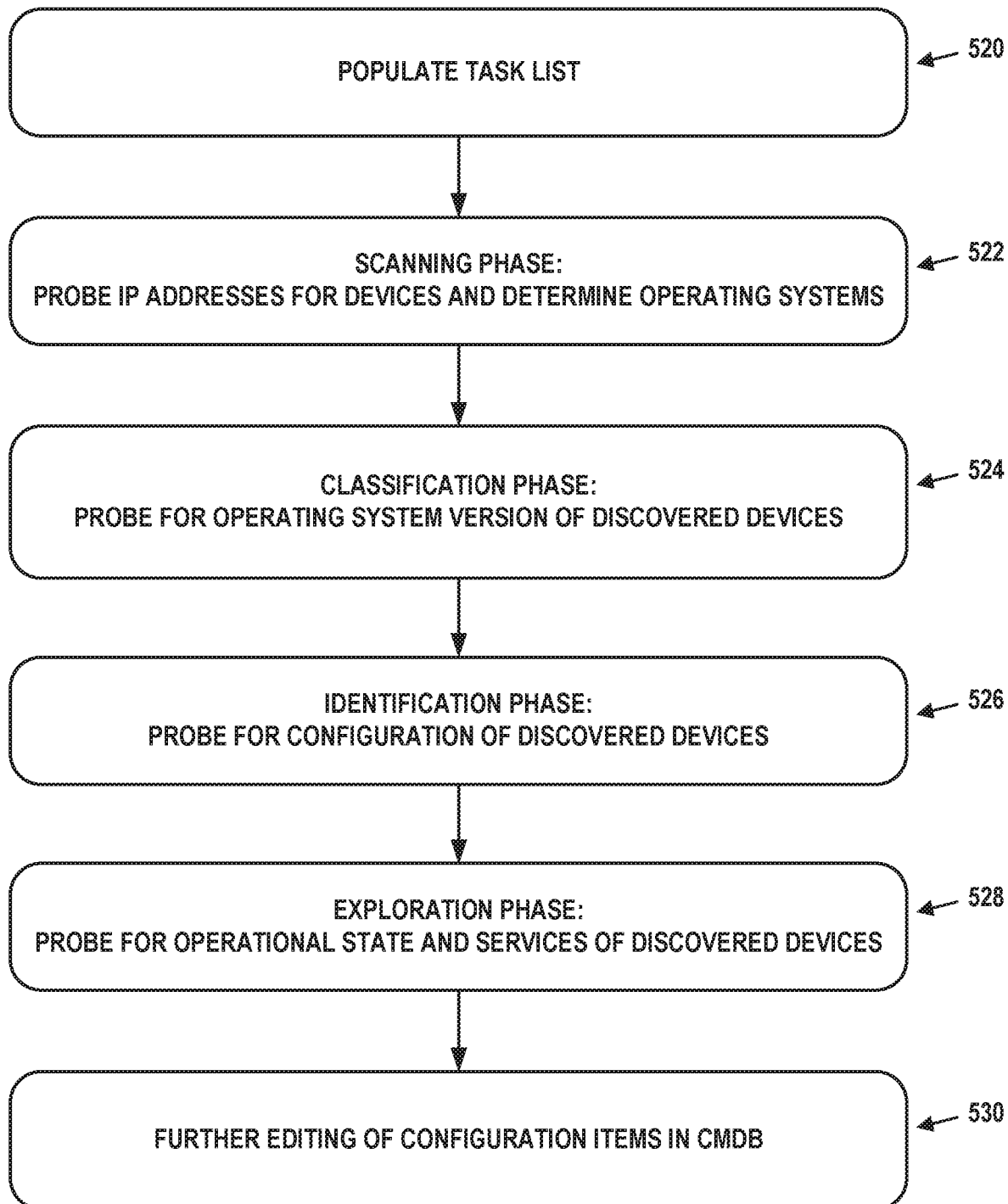
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE KEYWORD-BASED SERVICE MAPPING

As described above, in order for remote network management platform 320 to administer the devices, applications, and services of managed network 300, remote network management platform 320 may perform a discovery process that involves determining what devices are present in managed network 300, as well as the applications and services provided by the devices. Once the devices and their provided applications and services are identified, remote network management platform 320 may determine the relationships between discovered devices, applications, and services in a process referred to as service mapping.

One way for remote network management platform 320 to perform service mapping is to search the identified devices and applications of managed network 300 for specific files and to parse those files using predefined rules to identify predefined text patterns. As described above in connection with FIGS. 5A and 5B, a computing device of a computational instance, such as computational instance 322, may perform the service mapping process.

Figure 6:
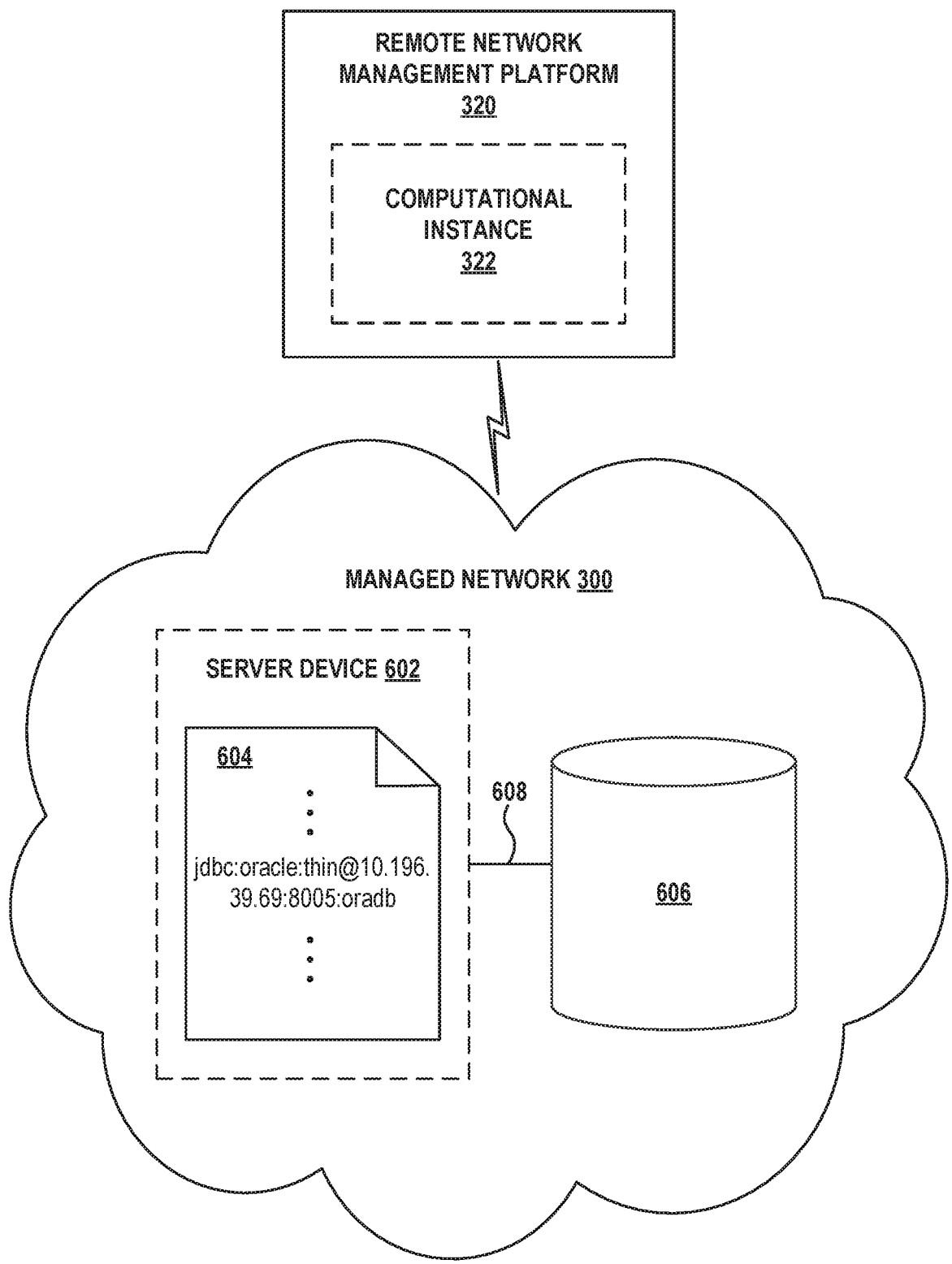
FIG. 6 depicts a communication environment involving a remote network management architecture, in accordance with example embodiments.

FIG. 6 depicts a particular example of service mapping for a server device 602 of managed network 300. When performing service mapping, remote network management platform 320 may search server device 602 for a particular file, such as servlet configuration file 604. Responsive to discovering servlet configuration file 604, remote network management platform 320 may parse the configuration file for predefined text patterns that are indicative of connections to or associations with other devices of managed network 300.

In examples where server device 602 is an Apache HTTP Server running the Apache TOMCAT® servlet, remote network management platform 320 may parse configuration file 604 for a text pattern according to the following format:

jdbc:.*:.*:.*(.*)

where the text ".*" is a placeholder for text that may indicate one or more connections to server device 602. It should be understood that this example is for illustrative purposes only, and managed network 300 may include additional and/or different types of devices running additional and/or different types of applications.

As shown, configuration file 604 includes the text pattern "jdbc:oracle:thin:@10.196.39.69:8005:oradb," which remote network management platform 320 may discover while parsing configuration file 604 for the predefined text pattern above. Based on this discovered text pattern, remote network management platform 320 may determine an operational mapping of server device 304. The predefined text pattern identifies an IP address ("10.196.39.69"), a port ("8005"), and database identifier ("oradb"). Based on this predefined text pattern, remote network management platform 320 may determine that server 602 interfaces with a database (shown as database 606) identified as oradb at the IP address 10.196.39.69 through port 8005. Accordingly, remote network management platform 320 may identify an operational connection 608 between server device 602 and database 606.

Remote network management platform 320 may similarly parse other configuration files stored on server device 602, as well as configuration files stored on other devices of managed network 300, for predefined text patterns that identify other connections among devices of managed network 300.

While the above-described service mapping technique may be useful for discovering connections between devices and applications of managed network 300 in some circumstances, there may be situations in which this technique has its drawbacks. In particular, the above technique involves searching for predefined files having predefined patterns of text, where the predefined files and text patterns depend on the types and versions of devices and applications of the managed network. As such, this service mapping technique may be tailored to work with a particular managed network, but it may not work with a different managed network that operates using different technology variants. Further, when an application or device of the managed network is updated or otherwise changed, remote network management platform 320 may also adjust the rules for which predefined files and text patterns are searched for in order to compensate for these changes. Accordingly, it may be desirable for remote network management platform 320 to use a service mapping technique that is more flexible and that does not rely on searching for predefined files and text patterns that depend on the particular technology of a managed network.

Keyword-based service mapping is an example of a service mapping technique that may provide more flexibility than the above-described technique. Keyword-based service mapping involves generating a list of keywords that may indicate operational connections between applications or devices of a managed network and searching files stored on the managed network for those keywords. The list of keywords may be a dynamic list that is generated based on preliminary discovery processes, as described in further detail below, such that the list of keywords may adapt for a given managed network and account for various technology variants or other changes to the managed network without having to alter rules associated with searching for predefined files and text patterns.

As described above in connection with FIGS. 5A and 5B, remote network management platform 320 may carry out a discovery process for identifying devices and applications of managed network 300, such as by probing IP addresses within a specified range of IP addresses, and storing details about the identified devices and applications as configuration items in CMDB 500. When performing keyword-based service mapping, remote network management platform 320 may use those configuration items to generate the list of keywords.

Figure 7A:
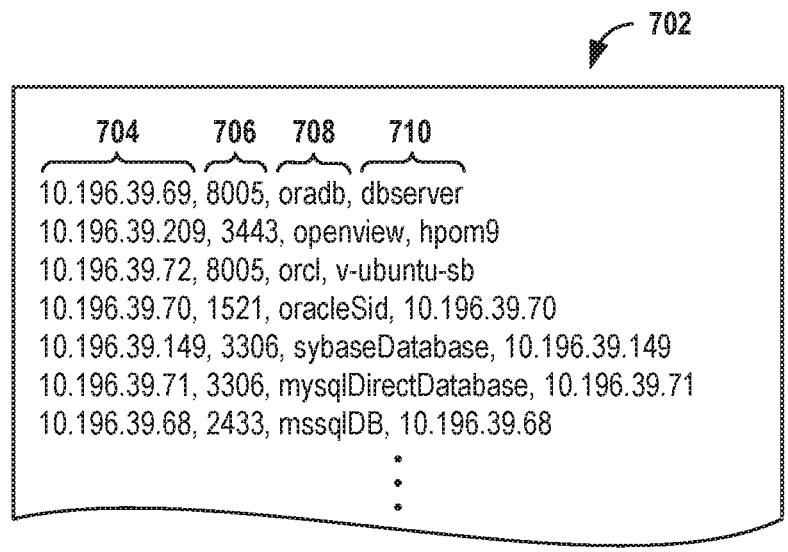
FIG. 7A depicts a set of configuration items of a managed network, in accordance with example embodiments.

FIG. 7A depicts a series of example configuration items 702 that remote network management platform 320 may obtain and store as a result of performing some or all of the discovery processes described above in connection with FIGS. 5A and 5B. Each configuration item may be associated with a particular device or application disposed within, or otherwise associated with, managed network 300 and may include identifying information about the particular device or application. As shown, each configuration item includes an IP address 704, a port number 706, an application identifier 708, and a device identifier 710 (which may be a name assigned to a device, or may be a network address, such as the IP address, of the device). Based on configuration items 702, remote network management platform 320 may generate a list of keywords for use in the keyword-based service mapping process. However, the configuration items are not limited to this format and may include additional, fewer, and/or different attributes in other examples.

Figure 7B:
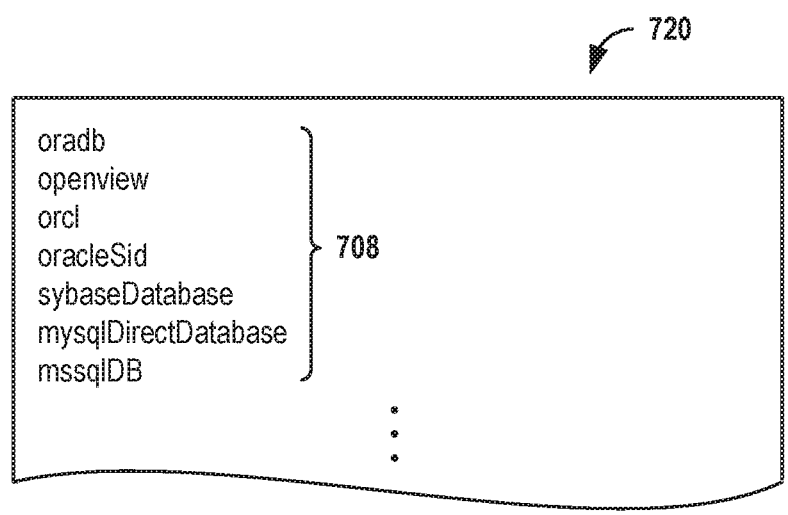
FIG. 7B depicts a list of keywords for use in a keyword-based service mapping process, in accordance with example embodiments.

FIG. 7B depicts an example list of keywords 720 for use in the keyword-based service mapping process. Remote network management platform 320 may generate the list of keywords 720 using some or all of the identifying information from configuration items 720. As a result, each keyword may be associated with a particular device or application disposed within, or otherwise associated with, managed network 300. For instance, as described above in connection with FIG. 6, the "oradb" keyword may be associated with a database stored on a server device of managed network 300.

As shown, the list of keywords 720 includes application identifiers 708 from configuration items 702. Application identifiers 708 may be useful keywords because the presence of one or more of application identifiers 708 in a file that is stored on a particular device of managed network 300 may indicate that the particular device is configured to execute a software application associated with that identifier 708 or is otherwise operationally connected to another device or computational instance associated with the that application identifier 708. However, in other examples, remote network management platform 320 may add additional and/or different identifying information from configuration items 702 to the list of keywords 720. For instance, in some examples, remote network management platform 320 may add IP addresses 704, port numbers 706, and/or device identifiers 710 to the list of keywords 720.

In some examples, remote network management platform 320 may additionally or alternatively add keywords to the list of keywords 720 based on user input. For instance, a user of managed network 300 may specify one or more keywords to be added to the list of keywords 720, and remote network management platform 320 may add the specified keywords to the list of keywords 720.

Once the list of keywords 720 is generated, remote network management platform 320 may perform keyword-based service mapping by searching for one or more of the keywords from the list of keywords 720 in one or more files stored on various computing devices disposed within managed network 300. Unlike the service mapping process described above that involves searching for specific configuration files and then searching for specific text patterns within those configuration files, keyword-based service mapping does not involve such a rigid search, but instead may involve searching files disposed within the managed network for keywords that may be used to refer to other devices and applications of managed network 300.

When searching for the keywords from the list of keywords 720, remote network management platform 320 may determine that a particular keyword is included in a file stored on a computing device of managed network 300 or in a file associated with a software application of managed network 300. For instance, referring back to FIG. 6, when searching server device 602, remote network management platform 320 may determine that the keyword "oradb" is included in configuration file 604.

Based on finding the particular keyword in the file associated with the computing device or software application of managed network 300, remote network management platform 320 may define an operational mapping between: (i) the computing device or software application associated with the particular keyword and (ii) the computing device or software application associated with the file in which the particular keyword was found. For instance, referring to FIG. 7A, remote network management platform 320 may use configuration items 702 to determine that the keyword "oradb" is associated with a computing device identified as "dbserver," which may be a server device of managed network 300. Accordingly, responsive to determining that the keyword "oradb" is included in configuration file 604, remote network management platform 320 may define an operational mapping between server device 602 and computing device dbserver. The operational mapping may indicate that server device 602 is operationally connected to dbserver and may further indicate that server device 602 interfaces with dbserver at IP address 10.196.39.69 through port 8005, as further indicated by configuration items 702. Similarly, if remote network management platform 320 finds the "oradb" keyword in a configuration file or any other file stored on various other computing devices of managed network 300, remote network management platform 320 may define an operational mapping between those other computing devices and computing device dbserver.

For each defined operational mapping, remote network management platform 320 may store the defined operational mapping in a database, such as in CMDB 500. Remote network management platform 320 may continue to search files associated with the devices and/or applications of managed network 300 for keywords from the list of keywords 720, define additional operational mappings based on identified keywords, and store the mappings in the database. As a result, the database may include a number of operational mappings indicating which and how various devices and/or applications of managed network 300 are operationally connected.

In some circumstances, using a keyword-based approach, such as the one described above, for service mapping may result in inaccurate operational mappings. For instance, a keyword from the list of keywords 720 may not only be associated with a particular device or software application, but may have alternative meanings or uses such that its presence in a particular file may not be indicative of an operational connection. And if remote network management platform 320 discovers such a keyword, this may result in a false positive where remote network management platform 320 defines an operational mapping that does not actually exist.

When performing keyword-based service mapping, remote network management platform 320 may take various precautions to reduce the extent of these false positives. For instance, in some examples, when searching for the keywords from the list of keywords 720, remote network management platform 320 may limit the search to files in particular locations or of a particular type. As an example, remote network management platform 320 may limit the search to installation directories. Additionally or alternatively, remote network management platform 320 may limit the search to text-based files and may exclude binary files from the search.

As another precaution for reducing the extent of false positives, remote network management platform 320 may search for combinations of keywords. For instance, responsive to determining that a file includes a particular one of the keywords from the list of keywords 720, remote network management platform 320 may further search the file to determine whether the file includes an additional one of the keywords from the list of keywords 720. As an example, where the list of keywords 720 includes both application identifiers 708 and IP addresses 704, remote network management platform 320 may search a file to determine whether the file includes both an application identifier 708 and an IP address 704. Responsive to determining that a file includes the combination of keywords, remote network management platform 320 may define an operational mapping as described above. Alternatively, if remote network management platform 320 only finds a keyword not in combination with another keyword, then remote network management platform 320 might not define an operational mapping based on the keyword or may discard any operational mapping defined based on the keyword.

In some examples, remote network management platform 320 might determine that a file includes a combination of keywords based on the keywords being associated together within the file. For instance, in order to determine whether the combination of keywords is present in the file, remote network management platform 320 may determine whether a first keyword (e.g., an application identifier 708) and a second keyword (e.g., an IP address 704) are included in the same line of the file or are within a threshold number of characters from one another within the file. Responsive to determining that the first and second keyword are included in the same line or within the threshold number of characters from one another, remote network management platform 320 may determine that the first and second keywords are associated within the file and that the combination of the first and second keywords is present in the file.

As yet another precaution for reducing the extent of false positives, remote network management platform 320 may determine a confidence value of an operational mapping, where the confidence value indicates an expected accuracy of the mapping. Remote network management platform 320 may determine the confidence value based on various factors. One factor may include the extent to which a particular keyword is included in a file. For instance, if a keyword occurs many times in a file, then this may indicate that the keyword has a meaning or use other than for establishing an operational connection between devices and/or applications. This may occur when the keyword is a generic word, such as "server," for example. As such, when remote network management platform 320 finds a keyword in a file, remote network management platform 320 may determine an occurrence frequency of the keyword in the file (e.g., how many times the keyword appears in the file), and, based on determining that the keyword is included in the file more than a threshold number of times, remote network management platform 320 may reduce the confidence value of the operational mapping associated with the keyword. In some examples, remote network management platform 320 may remove the keyword from the list of keywords 720 in response to determining that the keyword is included in the file more than the threshold number of times.

In some examples, the confidence value is based on additional or alternative factors. As an example, the confidence value may additionally or alternatively be based on the location or type of file in which a keyword is found. For instance, if remote network management platform 320 finds a keyword in an installation directory or in a configuration file, then remote network management platform 320 may increase the confidence value of an operational mapping associated with the keyword. As another example, the confidence value may additionally or alternatively be based on remote network management platform 320 finding a keyword in combination with another keyword from the list of keywords 720. For instance, if remote network management platform 320 finds a combination of keywords in a file, then remote network management platform 320 may increase the confidence value of an operational mapping associated with the combination of keywords.

In some examples, remote network management platform 320 may use the determined confidence value of an operational mapping to determine whether to store the operational mapping in CMDB 500. For instance, if the confidence value is above a threshold confidence value, then remote network management platform 320 may store the operational mapping in CMDB 500. On the other hand, if the confidence value is below a threshold confidence value, then remote network management platform 320 may discard the operational mapping or prompt a user to confirm the accuracy of the operational mapping or otherwise approve the operational mapping. For instance, responsive to determining that the confidence value of an operational mapping is below a threshold confidence value, remote network management platform 320 may cause a computing device of managed network 300 to display an indication of the operational mapping via a user interface of the computing device. The user of managed network 300 may provide, via the user interface, user input data indicating whether the user approves the operational mapping. If the user input data indicates that the operational mapping is approved, then remote network management platform 320 may store the operational mapping in CMDB 500. If the user input data indicates that the operational mapping is not approved, then remote network management platform 320 may discard the operation mapping.

VI. EXAMPLE OPERATIONS

Figure 8:
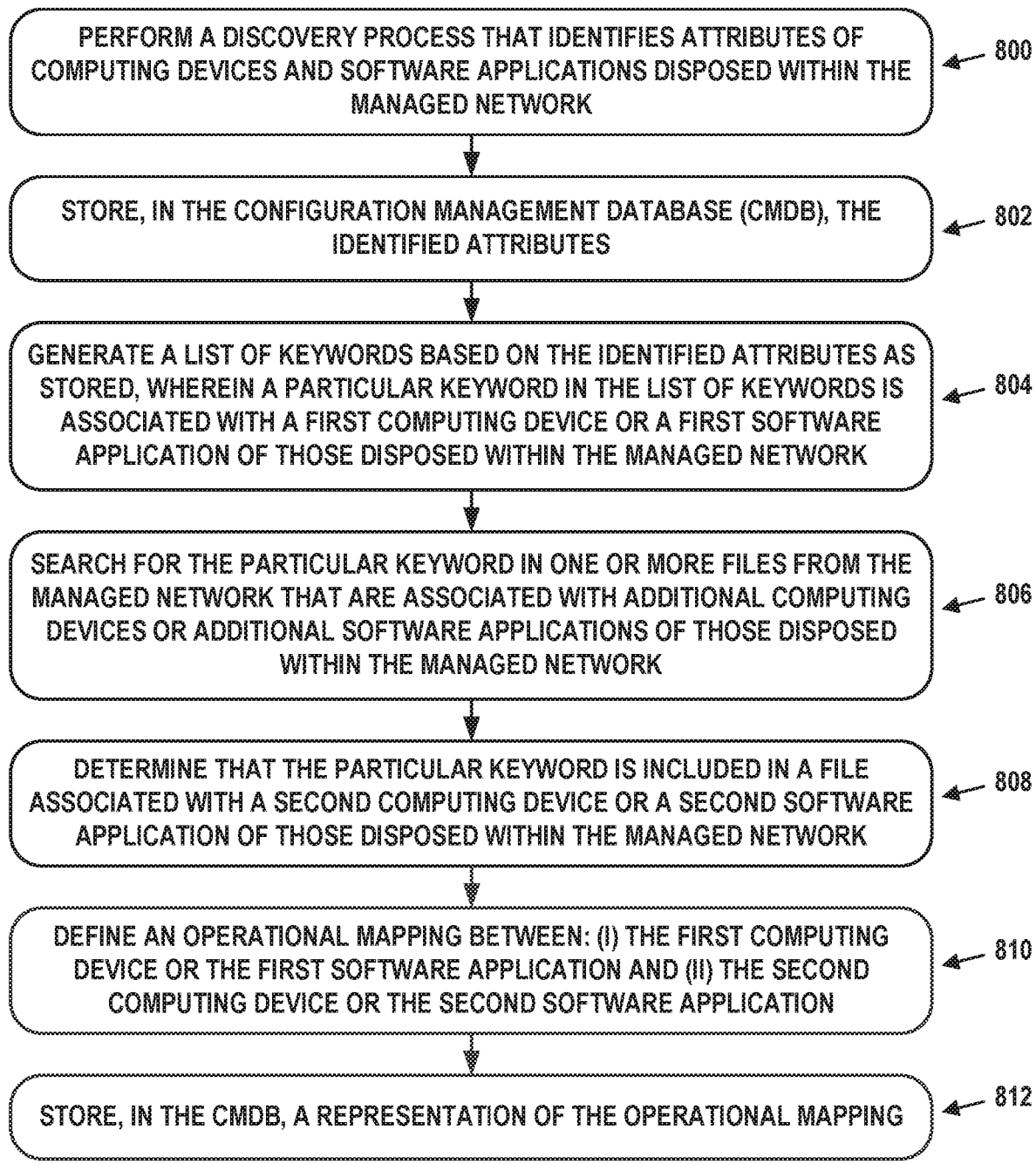
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

The embodiments of FIG. 8 may be carried out in connection with a computing system disposed within a computational instance of a remote network management platform that is associated with a managed network. The computing system may contain a configuration management database (CMDB) and may be configured to carry out the operations described in connection with the embodiments of FIG. 8.

Block 800 may involve the computing system performing a discovery process that identifies attributes of computing devices and software applications disposed within the managed network.

Block 802 may involve the computing system storing, in the CMDB, the identified attributes.

Block 804 may involve the computing system generating a list of keywords based on the identified attributes as stored. A particular keyword in the list of keywords may be associated with a first computing device or a first software application of those disposed within the managed network.

Block 806 may involve the computing system searching for the particular keyword in one or more files from the managed network that are associated with additional computing devices or additional software applications of those disposed within the managed network. In some embodiments, searching for the particular keyword in one or more files from the managed network may involve including text files in the search and excluding binary files from the search.

Block 808 may involve the computing system determining that the particular keyword is included in a file associated with a second computing device or a second software application of those disposed within the managed network.

Block 810 may involve the computing system defining an operational mapping between: (i) the first computing device or the first software application and (ii) the second computing device or the second software application.

Block 812 may involve the computing system storing, in the CMDB, a representation of the operational mapping.

In some embodiments, the computing system is further configured to determine a confidence value of the operational mapping. In these embodiments, storing the representation of the operational mapping may involve storing the representation of the operational mapping based on the determined confidence value.

In some embodiments, the computing system is further configured to determine that the confidence value of the operational mapping is above a threshold confidence value. In these embodiments, storing the representation of the operational mapping may involve storing the representation of the operational mapping based on the confidence value being above the threshold confidence value.

In some embodiments, the computing system is further configured to determine that the confidence value of the operational mapping is below a threshold confidence value and prompt a user of the managed network to approve the operational mapping based on the determined confidence value being below the threshold confidence value.

In some embodiments, determining the confidence value of the operational mapping may involve determining the confidence value of the operational mapping based on an occurrence frequency of the particular keyword in the one or more files from the managed network.

In some embodiments, the computing system may cause a proxy server of the managed network to perform some or all of the processes depicted by blocks 800, 802, 804, 806, 808, 810, and 812.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system is configured to run a computational instance of a remote network management platform that is associated with a managed network, wherein the computing system, comprises one or more processors, a configuration management database (CMDB), and a memory, wherein the memory is accessible by the one or more processors, and wherein the memory stores instructions that, when executed by the one or more processors, cause the one or more processors to:
    perform a discovery process that identifies attributes of computing devices and software applications disposed within the managed network;
    store, in the CMDB, the identified attributes;
    generate a list of keywords based on the identified attributes as stored, wherein a combination of keywords in the list of keywords is associated with a first computing device or a first software application of those disposed within the managed network;
    search for the combination of keywords in one or more files from the managed network that are associated with additional computing devices or additional software applications of those disposed within the managed network, wherein the combination of keywords comprises a first keyword being within a threshold number of characters from a second keyword in the one or more files;
    determine that the combination of keywords is included in a file associated with a second computing device or a second software application of those disposed within the managed network;
    define an operational mapping between: (i) the first computing device or the first software application and (ii) the second computing device or the second software application;
    increase a confidence value of the operational mapping based on the combination of keywords being included in the file associated with the second computing device or the second software application, wherein the confidence value indicates an expected accuracy of the operational mapping; and
    store, in the CMDB, a representation of the operational mapping based on the confidence value.

2. The computing system of claim 1, wherein the computing system is configured to:
    determine that the confidence value of the operational mapping is above a threshold confidence value, wherein the computing device stores the representation of the operational mapping based on the confidence value of the operational mapping being above the threshold confidence value.

3. The computing system of claim 1, wherein the computing system is configured to:
    determine that the confidence value of the operational mapping is below a threshold confidence value; and prompt a user of the managed network to approve the operational mapping based on the determined confidence value being below the threshold confidence value.

4. The computing system of claim 2, wherein determining the confidence value of the operational mapping is based on an occurrence frequency of the combination of keywords in the one or more files from the managed network.

5. The computing system of claim 1, wherein performing the discovery process that identifies the attributes of the computing devices and the software applications disposed within the managed network comprises causing a proxy server disposed within the managed network to identify the attributes of the computing devices and the software applications disposed within the managed network.

6. The computing system of claim 1, wherein the computing system is configured to include text files and exclude binary files from the search for the combination of keywords in the one or more files from the managed network.

7. The computing system of claim 1, wherein the identified attributes for each computing device comprises an IP address, a port number, an application identifier, or a device identifier, or any combination thereof.

8. A method for use in connection with a computational instance of a remote network management platform that is associated with a managed network, the method comprising:
performing a discovery process that identifies attributes of computing devices and software applications disposed within the managed network;
storing, in a configuration management database (CMDB) of the remote network management platform, the identified attributes;
generating a list of keywords based on the identified attributes as stored, wherein a combination of keywords in the list of keywords is associated with a first computing device or a first software application of those disposed within the managed network;
searching for the combination of keywords in one or more files from the managed network that are associated with additional computing devices or additional software applications of those disposed within the managed network, wherein the combination of keywords comprises a first keyword being within a threshold number of characters from a second keyword in the one or more files;
determining that the combination of keywords is included in a file associated with a second computing device or a second software application of those disposed within the managed network;
defining an operational mapping between: (i) the first computing device or the first software application and (ii) the second computing device or the second software application;
increasing a confidence value of the operational mapping based on the combination of keywords being included in the file associated with the second computing device or the second software application, wherein the confidence value indicates an expected accuracy of the operational mapping; and
storing, in the CMDB, a representation of the operational mapping based on the confidence value.

9. The method of claim 8, comprising:
determining, by the computational instance, that the confidence value of the operational mapping is above a threshold confidence value, wherein storing the representation of the operational mapping comprises storing the representation of the operational mapping based on the confidence value of the operational mapping being above the threshold confidence value.

10. The method of claim 8, comprising:
determining, by the computational instance, that the confidence value of the operational mapping is below a threshold confidence value; and
prompting a user of the managed network to approve the operational mapping based on the determined confidence value of the operational mapping being below the threshold confidence value.

11. The method of claim 9, wherein determining the confidence value of the operational mapping is based on an occurrence frequency of the combination of keywords in the one or more files from the managed network.

12. The method of claim 8, wherein performing the discovery process that identifies the attributes of the computing devices and the software applications disposed within the managed network comprises causing a proxy server disposed within the managed network to identify the attributes of the computing devices and the software applications disposed within the managed network.

13. The method of claim 8, wherein searching for the combination of keywords in the one or more files from the managed network comprises including text files and excluding binary files from the search.

14. The method of claim 8, wherein the identified attributes for each computing device comprises an IP address, a port number, an application identifier, or a device identifier, or any combination thereof.

15. An article of manufacture including a non-transitory computer-readable medium, having stored thereon program instructions that, upon execution by a computing system, cause the computing system to perform operations comprising:
performing a discovery process that identifies attributes of computing devices and software applications disposed within a managed network;
storing, in a configuration management database (CMDB), the identified attributes;
generating a list of keywords based on the identified attributes as stored, wherein a combination of keywords in the list of keywords is associated with a first computing device or a first software application of those disposed within the managed network;
searching for the combination of keywords in one or more files from the managed network that are associated with additional computing devices or additional software applications of those disposed within the managed network, wherein the combination of keywords comprises a first keyword being within a threshold number of characters from a second keyword in the one or more files;
determining that the combination of keywords is included in a file associated with a second computing device or a second software application of those disposed within the managed network;
defining an operational mapping between: (i) the first computing device or the first software application and (ii) the second computing device or the second software application;
increasing a confidence value of the operational mapping based on the combination of keywords being included in the file associated with the second computing device or the second software application, wherein the confidence value indicates an expected accuracy of the operational mapping; and storing, in the CMDB, a representation of the operational mapping based on the confidence value.

16. The article of manufacture of claim 15, the operations comprising:
determining that the confidence value of the operational mapping is above a threshold confidence value, wherein storing the representation of the operational mapping comprises storing the representation of the operational mapping based on the confidence value of the operational mapping being above the threshold confidence value.

17. The article of manufacture of claim 15, the operations comprising:
determining that the confidence value of the operational mapping is below a threshold confidence value; and
prompting a user of the managed network to approve the operational mapping based on the determined confidence value of the operational mapping being below the threshold confidence value.

18. The article of manufacture of claim 16, wherein determining the confidence value of the operational mapping is based on an occurrence frequency of the combination of keywords in the one or more files from the managed network.

19. The article of manufacture of claim 15, wherein performing the discovery process that identifies the attributes of the computing devices and the software applications disposed within the managed network comprises causing a proxy server disposed within the managed network to identify the attributes of the computing devices and the software applications disposed within the managed network.

20. The article of manufacture of claim 15, wherein the identified attributes for each of the computing devices comprises an IP address, a port number, an application identifier, or a device identifier, or any combination thereof.

* * * * *